United States Patent
Downie et al.

(10) Patent No.: US 10,066,860 B2
(45) Date of Patent: Sep. 4, 2018

(54) AIR CONDITIONING SYSTEM HAVING ACTIVELY CONTROLLED AND STABILIZED HOT GAS REHEAT CIRCUIT

(71) Applicant: Nortek Global HVAC LLC, O'Fallon, MO (US)

(72) Inventors: James Patrick Downie, O'Fallon, MO (US); Richard Brian Reed, O'Fallon, MO (US); Richard Gerard Blasko, Hubbart, OH (US); John Patrick McKissack, Memphis, TN (US); Avinash Keshavrao Gholap, O'Fallon, MO (US)

(73) Assignee: Nortek Global HVAC LLC, O'Fallon, MO (US)

( * ) Notice: Subject to any disclaimer, the term of this patent is extended or adjusted under 35 U.S.C. 154(b) by 420 days.

(21) Appl. No.: 14/662,550

(22) Filed: Mar. 19, 2015

(65) Prior Publication Data

US 2016/0273815 A1 Sep. 22, 2016

(51) Int. Cl.
| | |
|---|---|
| F25B 29/00 | (2006.01) |
| F25B 41/00 | (2006.01) |
| F25B 49/00 | (2006.01) |
| F25B 49/02 | (2006.01) |
| F25B 6/02 | (2006.01) |
| F24F 3/153 | (2006.01) |

(52) U.S. Cl.
CPC .............. *F25B 49/02* (2013.01); *F24F 3/153* (2013.01); *F25B 6/02* (2013.01); *F25B 2400/0403* (2013.01); *F25B 2600/111* (2013.01); *F25B 2600/112* (2013.01); *F25B 2600/2501* (2013.01); *F25B 2600/2515* (2013.01); *F25B 2700/02* (2013.01); *F25B 2700/21161* (2013.01); *F25B 2700/21173* (2013.01); *F25B 2700/21174* (2013.01); *Y02B 30/743* (2013.01)

(58) Field of Classification Search
CPC ...... F25B 2400/0403; F25B 2600/2507; F25B 2600/2501; F25B 2313/0253; F25B 2313/02531; F24F 3/153
USPC ................................. 62/173, 196.4
See application file for complete search history.

(56) References Cited

U.S. PATENT DOCUMENTS

| | | | | |
|---|---|---|---|---|
| 3,599,440 A | * | 8/1971 | Melion .................. | F25B 41/04 62/158 |
| 5,277,034 A | * | 1/1994 | Hojo ...................... | F24F 3/065 165/228 |

(Continued)

FOREIGN PATENT DOCUMENTS

WO WO-2010/039386 A2 4/2010

*Primary Examiner* — Ned Landrum
*Assistant Examiner* — Daniel C Comings
(74) *Attorney, Agent, or Firm* — Schwegman Lundberg & Woessner, P.A.

(57) ABSTRACT

A method for controlling an air conditioning system comprises routing refrigerant through an evaporator to cool air in a space, proportioning refrigerant flow from the evaporator between a condenser circuit and a hot gas reheat circuit that heats air leaving the evaporator, routing refrigerant flow from the condenser circuit and the hot gas reheat circuit through an expansion device and back to the evaporator, monitoring a first temperature at the evaporator, stabilizing proportioning of refrigerant flow between the condenser circuit and the hot gas reheat circuit based on the monitored first temperature.

22 Claims, 3 Drawing Sheets

(56) References Cited

U.S. PATENT DOCUMENTS

| | | | | |
|---|---|---|---|---|
| 6,029,466 | A | * | 2/2000 | Wieszt ................. B60H 1/3207 62/176.6 |
| 7,219,505 | B2 | | 5/2007 | Weber et al. |
| 7,434,415 | B2 | | 10/2008 | Knight |
| 2004/0089015 | A1 | | 5/2004 | Knight et al. |
| 2007/0137228 | A1 | * | 6/2007 | Li ......................... F25B 47/022 62/196.4 |
| 2010/0107668 | A1 | * | 5/2010 | Voorhis .................. F24F 3/153 62/176.3 |
| 2011/0100035 | A1 | * | 5/2011 | Taras ..................... F24F 3/153 62/90 |
| 2011/0154837 | A1 | * | 6/2011 | Taras ..................... F24F 3/153 62/79 |
| 2012/0023981 | A1 | * | 2/2012 | Chae ........................ F25B 5/02 62/115 |

* cited by examiner

AIR CONDITIONING SYSTEM HAVING ACTIVELY CONTROLLED AND STABILIZED HOT GAS REHEAT CIRCUIT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, Nordyne LLC. All Rights Reserved.

TECHNICAL FIELD

This document pertains generally, but not by way of limitation, to air conditioning systems utilizing hot gas reheat circuits.

BACKGROUND

Some conventional air conditioning systems utilize an indoor evaporator and an outdoor condenser. In conjunction with an expansion device, the outdoor condenser is used to rapidly lower the temperature of the refrigerant that is subsequently used to cool air of an indoor area. The refrigerant is heated with warm indoor air of the indoor area within the evaporator and then drawn into a compressor for circulating back to the condenser. Placement of the condenser outdoors allows heat from the refrigerant to be discharged to outdoor air.

Such systems often include a hot gas reheat circuit that is used to remove humidity from the conditioned air within the cooled space without providing additional cooling. Such conditions often arise on cool, rainy days in the springtime or autumn. The hot gas reheat circuit includes an indoor reheat coil that is located in the path of air exiting the evaporator. As such, the air is passed through the evaporator to remove humidity and to be cooled, while the reheat coil warms the air back to the temperature of the indoor area.

In order to maintain the proper temperature and humidity within the indoor space, one or more valves are used divide flow of refrigerant from the compressor between the outdoor condenser and the indoor reheat coil. These valves are typically operated in an on-off manner to split flow between the condenser and reheat coil with the addition of various bypass circuits. One such system, described in U.S. Pat. No. 7,219,505 to Weber et al., discloses the additional use of solenoid valves to exchange refrigerant between the reheat circuit and the cooling circuit in order to control refrigerant flow through the reheat circuit. Similarly, U.S. Patent Application Pub. No. 2011/0154837 to Taras discloses the use of pulse width modulation of solenoid valves to control reheat refrigerant flow. Both of these systems, however, merely set mechanical limits to the system and control reheat flow by diverting refrigerant through the additional bypass piping with on-off valves.

Overview

The present inventors have recognized, among other things, that hot gas reheat circuits have an inherent instability when operated in cool outdoor air temperatures. This instability tends to cause freezing in the system. In order to prevent this instability, previous air conditioning systems have imposed mechanical limits on hot gas reheat systems. Some systems only permit the valves that control flow into the hot gas reheat circuit to operate within a band considerably less than zero to one hundred percent, which considerably limits the effectiveness of the air conditioning system. For example, a system might be configured to only permit twenty five to seventy five percent of the refrigerant through the hot gas reheat circuit in order to avoid freezing in the system. In an example, the reheat algorithm and stabilization algorithm described herein provide a solution to the aforementioned recognized problem.

A method for controlling an air conditioning system comprises routing refrigerant through an evaporator to cool air in a space, proportioning refrigerant flow from the evaporator between a condenser circuit and a hot gas reheat circuit that heats air leaving the evaporator, routing refrigerant flow from the condenser circuit and the hot gas reheat circuit through an expansion device and back to the evaporator, monitoring a first temperature at the evaporator, stabilizing proportioning of refrigerant flow between the condenser circuit and the hot gas reheat circuit based on the monitored first temperature.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
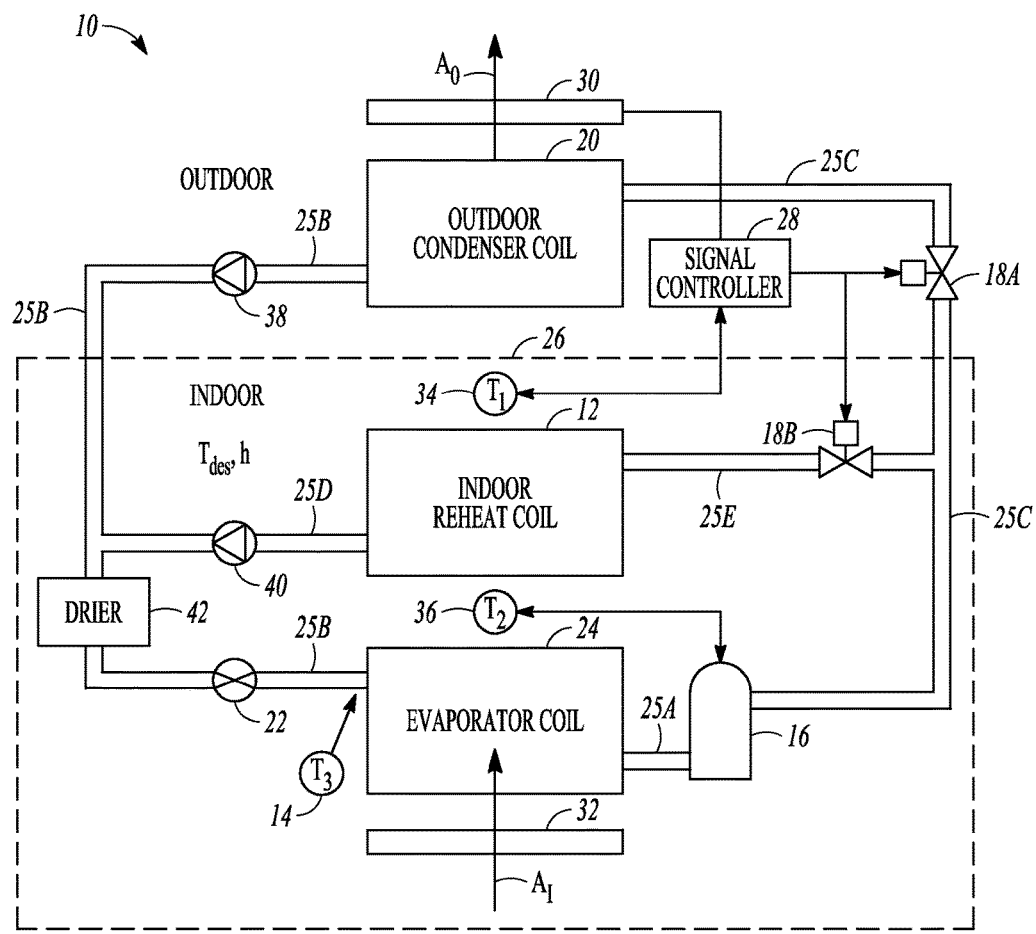
FIG. 1 is a schematic of an air conditioning system having an actively controlled and stabilized hot gas reheat circuit.

FIG. 1 is a schematic of air conditioning system 10 having reheat coil 12 with temperature sensor 14. System 10 also includes compressor 16, valves 18A and 18B, outdoor condenser 20, expansion device 22 and indoor evaporator 24, which are connected in series through refrigerant lines 25A-25C to form a vapor-compression circuit for conditioning indoor air $A_I$ of space 26.

System 10 is connected to a digital control system, which includes controller 28, outdoor fan 30, indoor fan 32, humidity sensor 33, and temperature sensors 34 and 36. Based upon factors such as humidity and temperatures sensed by sensors 33, 14, 34 and 36, controller 28 operates fans 30 and 32, compressor 16 and valves 18A and 18B to provide conditioned air to space 26.

System 10 also includes valves 38 and 40, which may comprise service valves used to control draining of fluid from system 10, or check valves configured to prevent back flow of fluid through the system. System 10 may also include drier 42, which operates conventionally to remove moisture from the refrigerant.

System 10 is configured as a split system in which compressor 16, evaporator 24 and expansion device 22 are positioned within space 26, and condenser 20 is positioned outside space 26. Space 26 comprises a building, home or any other enclosed space in which conditioned air is desired to be provided. Outdoor condenser 20 and indoor evaporator 24 are able to operate as both condensers and evaporators, and system 10 is operable to provide conditioned air to space 26 that is either heated or cooled. As such, valves 18A and 18B comprise two-way reversing valves, as are known in the industry, to allow refrigerant from compressor 16 through the vapor-compression circuit in forward and reverse directions.

In the disclosed embodiment, system 10 operates as an air conditioning system to provide cooled air to space 26 such that the vapor-compression circuit acts as a cooling circuit in parallel with a reheat circuit. The cooling circuit comprises compressor 16, condenser 20, expansion device 22, valve 18A, refrigerant lines 25A-25D, and evaporator 24. In the reheat circuit, condenser 20 and valve 18A are replaced with reheat coil 12 and valve 18B using refrigerant lines 25D and 25E. As such, evaporator 24 and reheat coil 12 are positioned in parallel within the vapor-compression circuit. The cooling circuit provides cooling and dehumidification to indoor air $A_I$ of space 26, while the hot gas reheat circuit is used to maintain the temperature of space 26 (e.g. without further cooling space 26) at the same time as providing dehumidification of indoor air $A_I$.

While system 10 is operating in a cooling mode to provide cooled indoor air $A_I$ to space 26, compressor 16 compresses a refrigerant to a high pressure and to a high temperature above that of ambient outdoor air $A_O$ such that the refrigerant is comprised substantially of superheated vapor. Any suitable refrigerant as is known in the industry may be used such as R-22 or R-410A refrigerants.

The evaporated refrigerant is discharged from compressor 16 where valve 18A operates to supply the refrigerant to condenser 20 through line 25C while controller 28 activates fan 30 to accelerate relatively cooler outdoor air $A_O$ across condenser 20. The refrigerant cools and condenses to a saturated liquid having a slightly lower temperature than before while still at a high pressure. From condenser 20, the refrigerant is passed through expansion device 22, which rapidly lowers the pressure and rapidly lowers the temperature of the refrigerant to below that of indoor air $A_I$ such that the refrigerant converts to a two-phase state of liquid and vapor in a flash evaporation process. Under pressure from compressor 16, the cold refrigerant continues to flow into evaporator 24 through line 25B where controller 28 activates fan 32 to accelerate relatively warmer indoor air $A_I$ across evaporator 24. Indoor air $A_I$ dumps heat to the refrigerant within evaporator 24 as indoor air $A_I$ passes over heat exchange circuits of evaporator 24. The refrigerant evaporates and absorbs heat from the relatively warmer indoor air $A_I$ such that the refrigerant is vaporized to a saturated vapor. The hot vapor is then drawn into compressor 16 through line 25A where it is compressed and heated into a high temperature, high pressure vapor such that the cycle can be repeated. Controller 28 monitors the temperature and humidity inputs to maintain space 26 at or near desired temperature $T_{des}$.

The hot gas reheat circuit includes refrigerant lines 25D and 25E, valve 18B and reheat coil 12. As discussed, in certain weather conditions, it is not necessary for system 10 to continuously cool indoor air $A_I$, such as when temperature $T_2$ is at or below temperature $T_{des}$, but it is desirable to continuously provide dehumidifying of indoor air $A_I$. During operation in a reheat mode, indoor air $A_I$ is dehumidified at evaporator 24 as the warm, moist air passes over the cool evaporator coils. The collected condensate water is discarded from system 10. However, this process also inherently results in indoor air $A_I$ being, in this case, undesirably cooled because space 26 has already been cooled to desired temperature $T_{des}$. In order to ensure indoor air $A_I$ is returned to space 26 at or near desired temperature $T_{des}$, indoor air $A_I$ is immediately routed over reheat coil 12 to be heated to or near temperature $T_{des}$.

The cooling circuit and the hot gas reheat circuit are actively controlled by controller 28 to proportion the flow of refrigerant between reheat coil 12 and evaporator 24 using valves 28A and 28B. In particular, controller 28 operates two control algorithms simultaneously based on sensed temperatures including discharge-air-temperature (DAT) $T_1$, leaving-air-temperature (LAT) $T_2$ and saturated-suction-temperature (SST) $T_3$. Controller 28 operates a DAT-controlled reheat algorithm to maintain cooling and dehumidification of space 26. Controller 28 also operates a SST-controlled proportional stabilization algorithm that restricts or governs operation of the reheat algorithm to prevent freezing of the reheat circuit. In other words, the reheat algorithm is free to operate within a range of operating parameters determined by the stabilization algorithm according to a predetermined range of operating temperatures.

Figure 2:
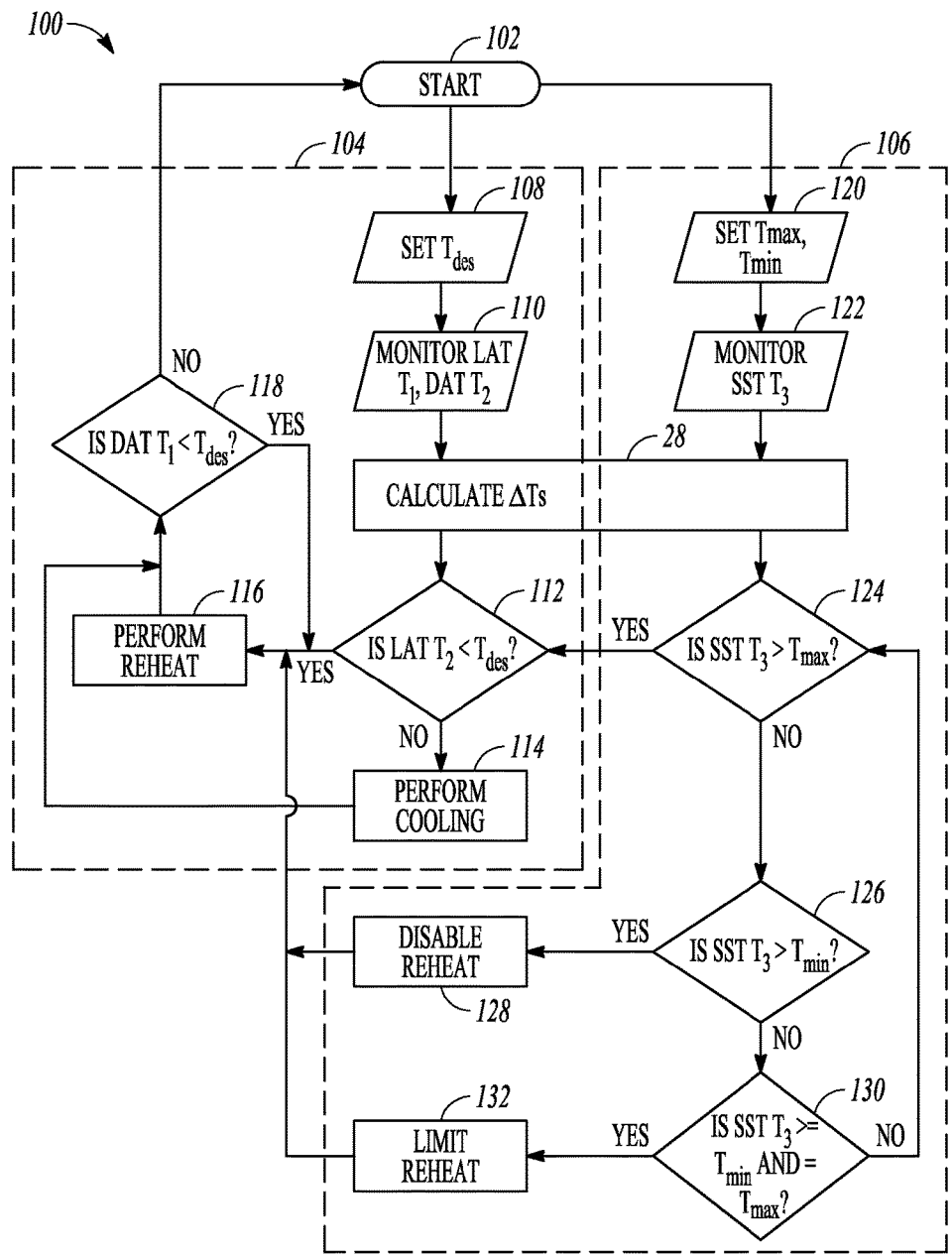
FIG. 2 is a flow chart diagramming logic for stabilizing active control of the hot gas reheat circuit of FIG. 1.

FIG. 2 is a flow chart diagramming logic 100 for stabilizing active control of the hot gas reheat circuit of FIG. 1. The control process of logic 100 begins at start 102, which is the beginning of both reheat algorithm 104 and stabilization algorithm 106.

In brief, in order to perform dehumidification without further cooling of indoor air $A_I$, reheat algorithm 104 directs more refrigerant through reheat coil 12 the further LAT $T_2$ is below desired temperature $T_{des}$ in space 26, in order to bring DAT $T_1$ closer to desired temperature $T_{des}$. If DAT $T_1$ becomes too warm, e.g., warmer than desired temperature $T_{des}$ of indoor air $A_I$ within space 26, more refrigerant will be directed through condenser 20 to perform cooling of indoor air $A_I$ at evaporator 24. Stabilization algorithm 106 limits how much refrigerant can be directed through reheat coil 12 in order prevent freezing in the system based on SST $T_3$.

At step 108, a user may input a desired temperature $T_{des}$ into controller 28, which is the temperature at which system 10 will operate to maintain space 26. At step 110, controller 28 monitors discharge-air-temperature (DAT) $T_1$ and leaving-air-temperature (LAT) $T_2$. DAT $T_1$ is the temperature of indoor air $A_I$ being delivered to space 26 after passing through evaporator 24 and reheat coil 12. LAT $T_2$ is the temperature of indoor air $A_I$ leaving evaporator 24. Controller 28 controls LAT $T_1$ by modulating the capacity of compressor 16 to change the flow of the refrigerant through system 10. Controller 28 controls DAT $T_1$ by controlling how much refrigerant flows through reheat coil 12 by controlling operation of valves 18A and 18B.

At step 112, controller 28 determines if LAT $T_1$ is less than $T_{des}$. If LAT $T_1$ is less than $T_{des}$, controller 28 will direct refrigerant flow through reheat coil 12, at step 116, in order to reheat indoor air $A_I$ back to $T_{des}$. If LAT $T_1$ is equal to or greater than $T_{des}$, controller 28 will direct more refrigerant flow through condenser 20, at step 114, in order to provide cooling of indoor air $A_I$ at evaporator 24.

In either scenario, controller 28 will check DAT $T_2$ at step 118 to determine if the temperature of indoor air $A_I$ is less that desired temperature $T_{des}$. If DAT $T_2$ is less than desired temperature $T_{des}$, controller 28 will initiate or continue reheating at step 116. If DAT $T_2$ is equal to or greater than desired temperature $T_{des}$, controller 28 will cycle through logic 100 from start 102. Steps 112, 114, 116 and 118 describe one way of executing reheat algorithm 104 to cool and dehumidify space 26. Other reheat algorithms may be used. In any embodiment, the reheat algorithm is configured to proportion refrigerant flow through valves 18A and 18B based on temperatures DAT $T_1$ and LAT $T_2$. In one embodiment, the reheat algorithm is configured to allow up to one hundred percent of the refrigerant flow through reheat coil 12 due to the oversight provided by stabilization algorithm 106.

In order to perform reheat at step 116 and cooling at step 114, valves 18A and 18B can be opened between zero percent and one hundred percent in any increment. Valves 18A and 18B are configured to operate proportionately such that the total percent open of the two valves always equals one hundred percent. For example, if valve 18A is open seventy percent, valve 18B is open thirty percent. Controller 28 can, therefore, actively modulate valves 18A and 18B in order to maintain desired temperature $T_{des}$ based on sensed inputs DAT $T_1$ and LAT $T_2$. Valves 18A and 18B allow refrigerant from compressor 16 through the vapor-compression circuit in a plurality of intermediate increments between zero percent and one hundred percent. In one embodiment, valves 18A and 18B may comprise adjustable valves, as are known in the art. In another embodiment, valves 18A and 18B comprise pulse width modulation valves, as are known in the art, that rapidly respond to input signals, such as solenoid valves or directly actuated valves. In an alternative embodiment, valves 18A and 18B may comprise a single three-way valve. Other valve arrangements may be used in other embodiments.

Typically, controller 28 operates reheat algorithm 104 to direct all, some or none of the refrigerant through the reheat circuit formed by compressor 16, reheat coil 12, expansion device 22 and evaporator 24 in order to provide dehumidification with evaporator 24, while offsetting the cooling provided by evaporator 24 with reheating at reheat coil 12. Hot gas reheating works very well for high temperatures of outdoor air $A_O$. However, at cooler temperatures, hot gas reheating may become unstable such that there is a propensity for freezing to occur in evaporator 24, particularly near the inlet of evaporator 24.

Controller 28 utilizes stabilization algorithm 106 to adjust, based on monitoring of SST $T_3$ near the inlet of evaporator 24 using sensor 14, the amount of refrigerant that can be routed through reheat coil 12. Controller 28 monitors SST $T_3$ at sensor 14 and can adjust refrigerant flow proportioned between condenser 20 and reheat coil 12 by valves 18A and 18B to prevent freezing. Stabilization algorithm 106 operates in three modes: a first mode where reheat algorithm 104 can operate freely, a second mode where reheat algorithm 104 cannot direct refrigerant to reheat coil 12, and a third mode where reheat algorithm 104 can only direct refrigerant to reheat coil up to a certain percentage or refrigerant flow at which stabilization algorithm 106 has determined that the reheat circuit will be stable.

At step 120, a user may input minimum temperature $T_{min}$ and maximum temperature $T_{max}$ between which stabilization algorithm 106 will stabilize reheat algorithm 104. Alternatively, maximum temperature $T_{max}$ and minimum temperature $T_{min}$ may be programmed into memory within controller 28 and may or may not be altered by an end user. In any embodiment, minimum temperature $T_{min}$ and maximum temperature $T_{max}$ preset in controller 28 so that reheat algorithm 104 and stabilization algorithm 106 may operate to stabilize the reheat circuit of system 10 to prevent freezing. At step 122, controller 28 monitors saturated-suction-temperature (SST) $T_3$.

At step 124, controller 28 determines if SST $T_3$ is greater than maximum temperature $T_{max}$. If SST $T_3$ is above maximum temperature $T_{max}$, reheat algorithm 104 will be able to operate freely at steps 112-118 without constraint from stabilization algorithm 106, with valve 18B being able to fully open up to one hundred percent. Maximum temperature $T_{max}$ is typically a temperature that is high enough at which point freezing of the evaporator inlet will not occur. In one embodiment, the maximum limit is approximately 45° F. (~7.2° C.).

Stabilization algorithm 106 also has a minimum temperature $T_{min}$ at which point reheat algorithm 104 will be prevented from directing any refrigerant to reheat coil 12. In other embodiments, reheat algorithm 104 also includes access to information provided to stabilization algorithm 106, such as minimum temperature $T_{min}$, maximum temperature $T_{max}$, SST $T_3$, and can perform some or all of the functions of stabilization algorithm 106. At step 126, controller 28 determines if SST $T_3$ is equal to or less than minimum temperature $T_{min}$. If SST $T_3$ is at or below minimum temperature $T_{min}$, reheat algorithm 104 will be prohibited, at step 128, from allowing any refrigerant through reheat coil at step 112 by stabilization algorithm 106, so that valve 18B will be fully closed to zero percent. Minimum temperature $T_{min}$ is typically a few degrees above freezing. In one embodiment, minimum temperature $T_{min}$ is approximately 35° F. (~1.67° C.).

At step 130, at temperatures of $T_3$ between maximum temperature $T_{max}$ and minimum temperature $T_{min}$, stabilization algorithm 106 will incrementally limit flow through reheat coil 12, at step 132, with increased restriction as $T_3$ approaches minimum temperature $T_{min}$. In one embodiment, there is a linear transition between maximum temperature $T_{max}$ and minimum temperature $T_{min}$. In the described embodiment, each degree below 45° F. (~7.2° C.) will result in a ten percent capacity reduction of valve 18B. For example, at 40° F. (~4.4° C.), valve 18B will be permitted to open up fifty percent. In other embodiments, non-linear transition schedules between maximum temperature $T_{max}$ and minimum temperature $T_{min}$ may be used.

TABLE 1

| $T_3$ | Valve 18B Maximum Opening Limit |
|---|---|
| >45° F. ($T_{max}$) | 100% |
| 35° F. >= AND = 45° F. | linear limit between $T_{max}$ and $T_{min}$ |
| <= 35° F. ($T_{min}$) | 0% flow |

Table 1 summarizes one schedule for the maximum and minimum opening of valve 18B below $T_{max}$ and at or above $T_{min}$. In other examples, other schedules can be used with different maximum and minimum temperatures and different transitions. Specifically, in some examples, $T_{min}$ can be as low as 32° F. (0° C.). In other examples, $T_{max}$ can be unlimited, such as to be set higher than temperatures that might occur for a given region of $A_O$. The schedule ensures that enough refrigerant will always be directed to condenser 20 to adequately reheat the refrigerant to a level that prevents freezing at evaporator 24. Stabilization algorithm 106 only sets constraints on reheat algorithm 104. Thus, reheat algorithm 104 will function normally until it runs into a limit set by stabilization algorithm 106.

Because more flow through reheat coil 12 gives rise to freezing conditions when outdoor air $A_O$ is cold, anytime the percentage of refrigerant flow through valve 18B dictated by stabilization algorithm 106 is less than the percentage of refrigerant flow through valve 18B dictated by reheat algorithm 104, the smallest percentage will take priority to prevent freezing. Thus, stabilization algorithm 106 will drive the control signal from controller 28 to activate valves 18A and 18B to limit flow through reheat coil 12 to avoid freezing conditions. For example, if reheat algorithm 104 is calling for refrigerant to be split fifty percent to reheat coil 12 and fifty percent to condenser 20 to maintain the desired conditions in space 26, but stability algorithm 106 is setting maximum opening of valve 18B at thirty percent based on SST $T_3$, valve 18B will only be permitted to open thirty percent. Conversely, if stability algorithm 106 is setting maximum opening of valve 18B at thirty percent based on SST $T_3$, and reheat algorithm 104 is calling for refrigerant to be split twenty percent to reheat coil 12 and eighty percent to condenser 20, reheat algorithm 104 will control and valve 18B will be commanded to open twenty percent. Thus, controller 28 will send control signals to valves 18A and 18B based on this hierarchy of the reheat and stabilization algorithms 104, 106, based on input from temperature sensors 14, 34 and 36.

Figure 3:
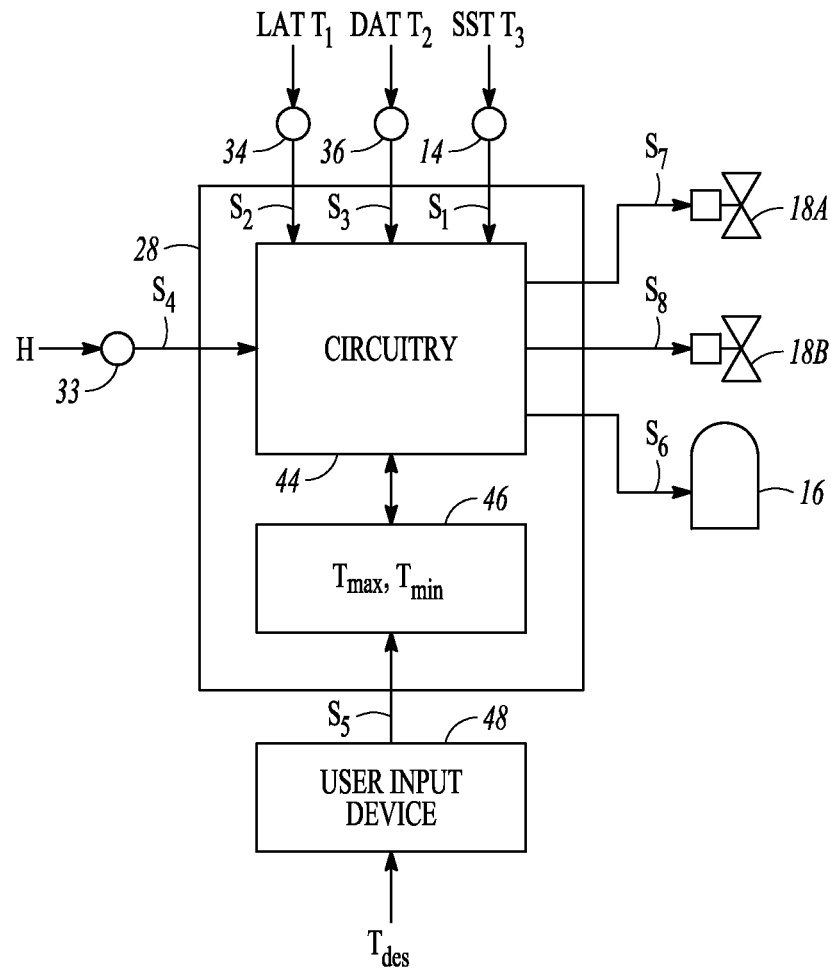
FIG. 3 is a diagram of a controller used to actively control and stabilize the hot gas reheat circuit as shown in FIG. 2.

FIG. 3 is a diagram of controller 28 used to actively control and stabilize the hot gas reheat circuit and cooling circuit of FIG. 1. Controller 28 includes circuitry 44, memory 46 and user input device 48. Controller 28 is connected in electronic communication with temperature sensors 14, 34 and 36, humidity sensor 33, valves 18A and 18B, and compressor 16.

Although not shown, controller 28 includes other components commonly found in electronic controllers, such as analog-to-digital converters that may convert analog input from sensors 14, 33, 34 and 36 to digital signals useable by circuitry 44, clocks, signal conditioners, signal filters, voltage regulators, current controls, modulating circuitry, input ports, output ports and the like.

Controller 28 includes appropriate input ports for receiving temperature signals $S_1$, $S_2$ and $S_3$ from temperature sensors 14, 34 and 36, respectively, and humidity signal $S_4$ from humidity sensor 33. Controller 28 also includes an input port for receiving user input $S_5$ from user input device 48. For example, a user of system 10 (FIG. 1) may input desired temperature $T_{des}$ into a thermostat or the like. Additionally, a maximum value for humidity H may also be input. Inputs from sensors 14, 33, 34 and 36 and user input device 48 may be stored in memory 46, another separate memory device, or may be provided directly to circuitry 44. Memory 46 may also be used to store system constraint parameters such as maximum temperature $T_{max}$ and minimum temperature $T_{min}$, the schedule of Table 1 and the logic for executing reheat algorithm 104 and stabilization algorithm 106. The memory, including memory 46, may comprise non-volatile random access memory (NVRM), read only memory, physical memory, optical memory or the like.

As discussed above with reference to FIG. 2, controller 28 controls compressor 16 with compressor signal $S_6$ based on LAT $T_2$ and controls valves 28A and 28B with signals $S_7$ and $S_8$, respectively, based on DAT $T_1$ in order to execute reheat algorithm 104. Reheat algorithm 104 may be initiated while LAT $T_2$ is below desired temperature $T_{des}$, and when dehumidification is desired because sensor 33 senses humidity H above a desired level. Reheat algorithm 104 is run by circuitry 28 and uses signals $S_6$, $S_7$ and $S_8$ to maintain desired temperature $T_{des}$ and the desired humidity H within space 26 (FIG. 1). Stabilization algorithm 106 is run by circuitry 44 as a background operation and has priority to override reheat algorithm 104 based in input from sensor 14 and maximum temperature $T_{max}$ and minimum temperature $T_{min}$, stored in memory 46. Circuitry 28 may comprise any suitable computing device such as an analog circuit, or a digital circuit, such as a microprocessor, a microcontroller, an application-specific integrated circuit (ASIC) or a digital signal processor (DSP).

With air conditioning system 10 and control logic algorithms 104, 106 described herein, hot gas reheat circuits may be used more effectively than in previous designs. Because stabilization algorithm 106 described herein monitors SST $T_3$ at the inlet of evaporator 24, valves 18A and 18B are allowed to be used to their full capacity, i.e. from zero to one hundred percent, without putting system 10 at risk of freezing. Thus, the needs for placing mechanical limitations and bypass circuits on the hot gas reheat circuit are unnecessary. As such, the hot gas reheat circuit may be used in wider operating conditions, increasing the overall efficiency of the air conditioning system. In particular, the hot gas reheat system described herein can be effectively used at lower outside temperatures near freezing.

VARIOUS NOTES & EXAMPLES

Example 1 can include a method for controlling an air conditioning system, and can include routing refrigerant through an evaporator to cool air in a space, proportioning refrigerant flow from the evaporator between a condenser circuit and a hot gas reheat circuit that heats air leaving the evaporator, routing refrigerant flow from the condenser circuit and the hot gas reheat circuit through an expansion device and back to the evaporator, monitoring a first temperature at the evaporator; and stabilizing proportioning of refrigerant flow between the condenser circuit and the hot gas reheat circuit based on the monitored first temperature.

Example 2 can include, or can optionally be combined with the subject matter of Example 1, to optionally include monitoring a second temperature at the hot gas reheat circuit, and modulating fluid flow through the hot gas reheat circuit based on the monitored second temperature.

Example 3 can include, or can optionally be combined with the subject matter of one or any combination of Examples 1 or 2 to optionally include that the second temperature comprises a discharge air temperature of a reheat coil in the hot gas reheat circuit.

Example 4 can include, or can optionally be combined with the subject matter of one or any combination of Examples 1, 2 or 3 to optionally include that the proportioned refrigerant flow is permitted to enter the hot gas reheat circuit from zero to one hundred percent of a total refrigerant flow in the air conditioning system.

Example 5 can include, or can optionally be combined with the subject matter of one or any combination of Examples 1, 2, 3 or 4 to optionally include monitoring a third temperature at the condenser circuit, and controlling output of a compressor based on the monitored third temperature, the compressor flowing refrigerant through the air conditioning system.

Example 6 can include, or can optionally be combined with the subject matter of one or any combination of Examples 1, 2, 3, 4 or 5 to optionally include that the third temperature comprises a leaving air temperature of the evaporator.

Example 7 can include, or can optionally be combined with the subject matter of one or any combination of Examples 1, 2, 3, 4, 5 or 6 to optionally include that the stabilization of the refrigerant flow allows proportioning of the refrigerant flow according to a first operation mode when the first temperature is above a preset maximum temperature, a second operation mode when the second temperature is at or below a preset minimum temperature, and a third operation mode when the first temperature is at or between the preset maximum temperature and the minimum temperature.

Example 8 can include, or can optionally be combined with the subject matter of one or any combination of Examples 1, 2, 3, 4, 5, 6 or 7 to optionally include that proportioning of the refrigerant flow between the condenser circuit and the hot gas reheat circuit is controlled by a reheat algorithm that actively controls a percentage of refrigerant flow from the evaporator that flows to the condenser circuit and to the hot gas reheat circuit in order to cool and dehumidify the air of the space.

Example 9 can include, or can optionally be combined with the subject matter of one or any combination of Examples 1, 2, 3, 4, 5, 6, 7 or 8 to optionally include that stabilization of the proportioning of refrigerant flow between the condenser circuit and the hot gas reheat circuit is controlled by a stabilization algorithm that overrides the reheat algorithm to limit refrigerant flow through the hot gas reheat circuit based on the monitored first temperature.

Example 10 can include, or can optionally be combined with the subject matter of one or any combination of Examples 1, 2, 3, 4, 5, 6, 7, 8 or 9 to optionally include that the stabilization algorithm prevents refrigerant flow through the hot gas reheat circuit when the monitored first temperature is at or below a minimum temperature.

Example 11 can include, or can optionally be combined with the subject matter of one or any combination of Examples 1, 2, 3, 4, 5, 6, 7, 8, 9 or 10 to optionally include that the stabilization algorithm allows unrestricted refrigerant flow through the hot gas reheat circuit when the monitored first temperature is above a maximum temperature.

Example 12 can include, or can optionally be combined with the subject matter of one or any combination of Examples 1, 2, 3, 4, 5, 6, 7, 8, 9, 10 or 11 to optionally include that the stabilization algorithm linearly changes the permitted refrigerant flow through the hot gas reheat circuit when the monitored first temperature is at or between the minimum and maximum temperatures.

Example 13 can include subject matter such as an air conditioning system that can include a vapor-compression circuit comprising an evaporator, a compressor, a condenser and an expansion device, a reheat coil arranged in parallel with the condenser to form a hot gas reheat circuit, a valve arrangement configured to proportion refrigerant flow from the compressor to the reheat coil and the condenser, a first temperature sensor configured to sense a first temperature at the evaporator, and a controller configured to limit proportioning of the refrigerant flow by the valve arrangement based on the first temperature.

Example 14 can include, or can optionally be combined with the subject matter of Example 13, to optionally include that the first temperature sensor is positioned at an inlet of the evaporator.

Example 15 can include, or can optionally be combined with the subject matter of Examples 13 or 14, to optionally include that the controller operates the valve arrangement using a stabilization algorithm that restricts refrigerant flow through the reheat coil based on the sensed first temperature in order to prevent freezing at the evaporator.

Example 16 can include, or can optionally be combined with the subject matter of Examples 13, 14 or 15, to optionally include a second temperature sensor configured to sense a second temperature at the hot gas reheat circuit, wherein the controller is configured to use a reheat algorithm to operate the valve arrangement based on the sensed second temperature, and wherein the reheat algorithm is governed by the stabilization algorithm.

Example 17 can include, or can optionally be combined with the subject matter of Examples 13, 14, 15 or 16, to optionally include a third temperature sensor configured to sense a third temperature at the vapor-compression circuit, and a compressor configured to move refrigerant through the vapor-compression circuit, wherein the controller is configured to control the compressor to adjust the second temperature.

Example 18 can include, or can optionally be combined with the subject matter of Examples 13, 14, 15, 16, or 17 to optionally include that the valve arrangement comprises a first valve positioned to control refrigerant flow to the condenser, and a second valve positioned to control refrigerant flow to the reheat coil.

Example 19 can include, or can optionally be combined with the subject matter of Examples 13, 14, 15, 16, 17 or 18 to optionally include that the first and second valves comprise adjustable valves configured to be operated between zero and one hundred percent capacity and at a plurality of increments therebetween.

Example 20 can include subject matter such as a controller for an air conditioning system having a vapor-compression circuit and a hot gas reheat circuit, and can include a first input for receiving a first temperature signal from a first temperature sensor at the hot gas reheat circuit of the air conditioning system, a second input for receiving a second temperature signal from a second temperature sensor at an inlet of an evaporator in the vapor-compression circuit, and circuitry configured to generate a valve control signal for controlling a reheat valve that controls refrigerant flow through the hot gas reheat circuit based on the first temperature signal in order to maintain a temperature of a space cooled by the evaporator, and generate a stabilization signal to override the valve control signal based on the second temperature signal.

Example 21 can include, or can optionally be combined with the subject matter of Example 20, to optionally include that the stabilization signal comprises a close signal that fully closes the reheat valve if the second temperature signal is at or below a preset minimum temperature.

Example 22 can include, or can optionally be combined with the subject matter of Examples 20 or 21, to optionally include that the stabilization signal comprises an open signal for allowing the reheat valve to fully open if the second temperature signal is above a preset maximum temperature.

Example 23 can include, or can optionally be combined with the subject matter of Examples 20, 21 or 22, to optionally include that the stabilization signal comprises a proportioning signal for gradually closing the hot gas reheat circuit valve between the preset minimum temperature and the preset maximum temperature according to a preset schedule.

Example 24 can include, or can optionally be combined with the subject matter of Examples 20, 21, 22 or 23, to optionally include memory in communication with the circuitry, the memory having stored therein the preset maximum and minimum temperatures and the preset schedule.

Example 25 can include, or can optionally be combined with the subject matter of Examples 20, 21, 22, 23 or 24, to optionally include a third input for receiving a third temperature signal from a third temperature sensor at the vapor-compression circuit, and wherein the circuitry is configured to generate a compressor signal to control a compressor in the vapor-compression circuit.

Example 26 can include, or can optionally be combined with the subject matter of Examples 20, 21, 22, 23, 24 or 25 to optionally include that the circuitry is in electronic communication with the first and second temperature sensors and a reheat valve that receives the valve signal.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A method for controlling an air conditioning system, the method comprising:
    routing refrigerant through an evaporator to cool air in a space;
    proportioning refrigerant flow from the evaporator between a condenser circuit and a dedicated hot gas reheat circuit that heats air leaving the evaporator;
    routing refrigerant flow from the condenser circuit through an expansion device and back to the evaporator;
    monitoring a first refrigerant temperature at the evaporator; and
    stabilizing proportioning of refrigerant flow between the condenser circuit and the hot gas reheat circuit based on the monitored first refrigerant temperature, wherein stabilizing proportioning:
    allows unrestricted flow of refrigerant from the dedicated hot gas reheat circuit to bypass the condenser through the reheat coil, to the expansion device, and to the evaporator when the monitored first refrigerant temperature is determined to be above a maximum saturated suction temperature,
    limits flow of refrigerant from the dedicated hot gas reheat circuit to bypass the condenser through the reheat coil through the expansion device, and to the evaporator when the monitored first refrigerant temperature is below the maximum saturated suction temperature and above a minimum saturated suction temperature, and
    halts flow so as to disable reheat when the monitored first refrigerant temperature is below the minimum saturated suction temperature.

2. The method of claim 1, further comprising:
    monitoring a second temperature at the hot gas reheat circuit; and
    modulating fluid flow through the hot gas reheat circuit based on the monitored second temperature.

3. The method of claim 2, wherein the second temperature comprises a discharge air temperature of a reheat coil in the hot gas reheat circuit.

4. The method of claim 2, wherein the proportioned refrigerant flow is permitted to enter the hot gas reheat circuit from zero to one hundred percent of a total refrigerant flow in the air conditioning system.

5. The method of claim 2, further comprising:
monitoring a third temperature at the condenser circuit; and
controlling output of a compressor based on the monitored third temperature, the compressor flowing refrigerant through the air conditioning system.

6. The method of claim 5, wherein the third temperature comprises a leaving air temperature of the evaporator.

7. The method of claim 1, wherein proportioning of the refrigerant flow between the condenser circuit and the hot gas reheat circuit is controlled by a reheat algorithm that actively controls a percentage of refrigerant flow from the evaporator that flows to the condenser circuit and to the hot gas reheat circuit in order to cool and dehumidify the air of the space.

8. The method of claim 7, wherein stabilization of the proportioning of refrigerant flow between the condenser circuit and the hot gas reheat circuit is controlled by a stabilization algorithm that overrides the reheat algorithm to limit refrigerant flow through the hot gas reheat circuit based on the monitored first temperature.

9. The method of claim 1, wherein the stabilization algorithm linearly changes the permitted refrigerant flow through the hot gas reheat circuit when the monitored first temperature is at or between the minimum and maximum saturated suction temperatures.

10. The method of claim 1, further comprising:
presetting the maximum saturated suction temperature and the minimum saturated suction temperature.

11. An air conditioning system comprising:
a vapor-compression circuit comprising an evaporator, a compressor, a condenser and an expansion device;
a reheat coil arranged in parallel with the condenser to form a condenser circuit and a dedicated hot gas reheat circuit, the reheat coil configured to receive refrigerant flow from the dedicated hot gas reheat circuit to bypass the condenser, the reheat coil configured to discharge refrigerant flow to the expansion device and back to the evaporator;
a valve arrangement configured to proportion refrigerant flow from the compressor to the reheat coil and the condenser;
a discharge air sensor configured to sense a discharge air temperature at a unit discharge;
a leaving air sensor configured to sense an evaporator leaving air temperature;
a first refrigerant temperature sensor configured to sense a first refrigerant temperature at the evaporator; and
a controller configured to:
control the valve arrangement to proportion refrigerant to flow through the reheat coil when the evaporator leaving air temperature is lower than a setpoint temperature and configured to proportion refrigerant flow to the condenser when the discharge air temperature is at or lower than the setpoint temperature; and
limit proportioning of the refrigerant flow to the reheat coil by being configured to:
operate the valve arrangement to modulate the valve arrangement to allow unrestricted flow of refrigerant to the reheat coil when the first refrigerant temperature is above a maximum saturated suction temperature,
operate the valve arrangement to limit flow of refrigerant to the reheat coil when the first refrigerant temperature is below the maximum saturated suction temperature and above a minimum saturated suction temperature, and
operate the valve arrangement to prevent flow of refrigerant to the reheat coil when the refrigerant temperature is below the minimum saturated suction temperature.

12. The air conditioning system of claim 11, wherein the first refrigerant temperature sensor is positioned at an inlet of the evaporator.

13. The air conditioning system of claim 11, wherein the controller operates the valve arrangement using a stabilization algorithm that restricts refrigerant flow through the reheat coil based on the sensed first temperature in order to prevent freezing at the evaporator.

14. The air conditioning system of claim 11, wherein the valve arrangement comprises:
a first valve positioned to control refrigerant flow to the condenser; and
a second valve positioned to control refrigerant flow to the reheat coil.

15. The air conditioning system of claim 14, wherein the first and second valves comprise adjustable valves configured to be operated between zero and one hundred percent capacity and at a plurality of increments therebetween.

16. A controller for an air conditioning system having a vapor-compression circuit and a hot gas reheat circuit, the controller comprising:
a first input for receiving a first temperature signal from a first temperature sensor at the hot gas reheat circuit of the air conditioning system;
a second input for receiving a second refrigerant temperature signal from a second temperature sensor at an inlet of an evaporator in the vapor-compression circuit; and
circuitry configured to:
generate a valve control signal for controlling a modulating reheat valve in the reheat circuit that controls refrigerant flow through the hot gas reheat circuit to bypass the condenser when the first temperature signal indicates that the first temperature is greater than a desired space temperature, in order to maintain a temperature of a space cooled by the evaporator; and
generate a stabilization signal to override the valve control signal to allow the modulating reheat valve in the reheat circuit to cause an unrestricted amount of refrigerant to bypass the condenser and enter the reheat coil when the second refrigerant temperature signal indicates a refrigerant temperature is above a maximum saturated suction temperature, to allow the modulating reheat valve in the reheat circuit to cause a limited amount of refrigerant to bypass the condenser and enter the reheat coil when the second refrigerant temperature signal indicates the refrigerant temperature is at or between a minimum and a maximum saturated suction temperature, and to prevent the modulating reheat valve in the reheat from allowing refrigerant to bypass the condenser and enter the reheat coil when the second refrigerant temperature signal indicates the refrigerant temperature is below a minimum saturated suction temperature.

17. The controller of claim 16, wherein the stabilization signal comprises a close signal that fully closes the reheat valve if the second refrigerant temperature signal is at or below a preset minimum temperature.

18. The controller of claim 17, wherein the stabilization signal comprises an open signal for allowing the reheat valve to fully open if the second refrigerant temperature signal is above a preset maximum temperature.

19. The controller of claim 18, wherein the stabilization signal comprises a proportioning signal for gradually closing the hot gas reheat circuit valve between the preset minimum temperature and the preset maximum temperature according to a preset schedule.

20. The controller of claim 19, further comprising memory in communication with the circuitry, the memory having stored therein the preset maximum and minimum temperatures and the preset schedule.

21. The controller of claim 16, further comprising:
- a third input for receiving a third temperature signal from a third temperature sensor at the vapor-compression circuit; and
- wherein the circuitry is configured to generate a compressor signal to control a compressor in the vapor-compression circuit.

22. The controller of claim 16, wherein the circuitry is in electronic communication with the first and second temperature sensors and a reheat valve that receives the valve signal.

* * * * *

UNITED STATES PATENT AND TRADEMARK OFFICE
CERTIFICATE OF CORRECTION

PATENT NO. : 10,066,860 B2
APPLICATION NO. : 14/662550
DATED : September 4, 2018
INVENTOR(S) : Downie et al.

Page 1 of 1

It is certified that error appears in the above-identified patent and that said Letters Patent is hereby corrected as shown below:

In the Claims

In Column 12, Line 52, in Claim 1, after "coil", insert --,--

Signed and Sealed this
Eighth Day of December, 2020

Andrei Iancu
*Director of the United States Patent and Trademark Office*